United States Patent
Bourdages et al.

(10) Patent No.: US 12,015,698 B2
(45) Date of Patent: Jun. 18, 2024

(54) CENTRALIZED REMOTE MIGRATION CLIENT CREDENTIAL MANAGEMENT

(71) Applicants: MICROSOFT TECHNOLOGY LICENSING, LLC, Redmond, WA (US); Simon Bourdages, Redmond, WA (US); Hani G. Loza, Kirkland, WA (US); Joe K. Yap, Sammamish, WA (US); Zhigang Zhang, Suzhou-SIP (CN); Hongliang Zhu, Suzhou-SIP (CN); Huan Wang, Suzhou-SIP (CN); Yogesh Abhaykumar Ratnaparkhi, Issaquah, WA (US); Mrinalini Chakravarty, Seattle, WA (US); Dieter Jansen, Redmond, WA (US)

(72) Inventors: Simon Bourdages, Redmond, WA (US); Hani G. Loza, Kirkland, WA (US); Joe K. Yap, Sammamish, WA (US); Zhigang Zhang, Suzhou-SIP (CN); Hongliang Zhu, Suzhou-SIP (CN); Huan Wang, Suzhou-SIP (CN); Yogesh Abhaykumar Ratnaparkhi, Issaquah, WA (US); Mrinalini Chakravarty, Seattle, WA (US); Dieter Jansen, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/761,546

(22) PCT Filed: Sep. 17, 2019

(86) PCT No.: PCT/CN2019/106112
§ 371 (c)(1),
(2) Date: Mar. 17, 2022

(87) PCT Pub. No.: WO2021/051259
PCT Pub. Date: Mar. 25, 2021

(65) Prior Publication Data
US 2022/0337402 A1    Oct. 20, 2022

(51) Int. Cl.
*H04L 9/08* (2006.01)
*H04L 9/32* (2006.01)

(52) U.S. Cl.
CPC .......... *H04L 9/0825* (2013.01); *H04L 9/0894* (2013.01); *H04L 9/3226* (2013.01)

(58) Field of Classification Search
CPC .... H04L 9/0825; H04L 9/0894; H04L 9/3226
(Continued)

(56) References Cited

U.S. PATENT DOCUMENTS

| | | |
|---|---|---|
| 8,874,914 B2 | 10/2014 | Stauth et al. |
| 9,128,626 B2 | 9/2015 | Chacko |

(Continued)

FOREIGN PATENT DOCUMENTS

| | | |
|---|---|---|
| CN | 102986190 A | 3/2013 |
| CN | 107465689 A | 12/2017 |

(Continued)

OTHER PUBLICATIONS

"International Search Report and Written Opinion Issued in PCT Application No. PCT/CN19/106112", dated Jun. 16, 2020, 9 Pages.

(Continued)

*Primary Examiner* — Moeen Khan
(74) *Attorney, Agent, or Firm* — Han Gim; Newport IP, LLC (57) ABSTRACT

A cloud-based network receives a public key of a public/private key pair and a credential for accessing secrets
(Continued)

associated with a user network. The cloud-based network receives, from a user interface configured to facilitate remote control of the user network, a command to be executed at the user network. The cloud-based network encrypts, using the public key, the credential and the command. The cloud-based network forwards, to one or more client devices, the encrypted credential and command. The client devices are configured to decrypt the encrypted credential and command using a private key of the public/private key pair and execute the command on the user network.

12 Claims, 8 Drawing Sheets

(58) Field of Classification Search
USPC .......................................................... 713/171
See application file for complete search history.

(56) References Cited

U.S. PATENT DOCUMENTS

| | | | |
|---|---|---|---|
| 9,935,937 | B1 | 4/2018 | Potlapally et al. |
| 10,826,875 | B1* | 11/2020 | Kim ..................... H04L 63/0428 |
| 2006/0067244 | A1* | 3/2006 | Sekaran ................. H04L 67/14 |
| | | | 370/252 |
| 2011/0137991 | A1* | 6/2011 | Russell .................. G06Q 10/06 |
| | | | 709/204 |
| 2013/0046982 | A1* | 2/2013 | Suh ....................... H04L 63/102 |
| | | | 713/171 |
| 2014/0059541 | A1 | 2/2014 | Heninger et al. |
| 2014/0089658 | A1* | 3/2014 | Raghuram .......... G06F 9/45533 |
| | | | 380/278 |
| 2014/0208111 | A1* | 7/2014 | Brandwine ........... H04L 9/0844 |
| | | | 713/171 |
| 2015/0039891 | A1* | 2/2015 | Ignatchenko ....... H04L 63/0853 |
| | | | 718/1 |
| 2017/0237601 | A1* | 8/2017 | Zhu ..................... H04L 12/4633 |
| | | | 709/223 |
| 2017/0257215 | A1 | 9/2017 | Huang |
| 2018/0060101 | A1* | 3/2018 | Zhu ....................... H04L 63/029 |
| 2018/0227300 | A1* | 8/2018 | Nakic ................. H04L 63/0442 |
| 2018/0324159 | A1 | 11/2018 | Koya |
| 2019/0384632 | A1* | 12/2019 | Parikh ................... G06F 21/554 |
| 2020/0143040 | A1* | 5/2020 | Sutton ..................... G06F 3/067 |
| 2021/0051137 | A1* | 2/2021 | Ruiz ....................... H04L 67/10 |

FOREIGN PATENT DOCUMENTS

| | | |
|---|---|---|
| CN | 106464717 A | 5/2019 |
| CN | 107968783 A | 10/2021 |
| WO | 2012004185 A1 | 1/2012 |
| WO | 2018102692 A1 | 6/2018 |

OTHER PUBLICATIONS

"AWS Key Management Service features", Retreived From: https://web.archive.org/web/20190104083044/https:/aws.amazon.com/kms/features/, Jan. 4, 2019, 7 Pages.
"AWS Snowball", Retrieved From: https://web.archive.org/web/20190104075629/https:/aws.amazon.com/snowball/, Jan. 4, 2019, 11 Pages.
"Creating a Storage Transfer Service Client for a Google API library-", Retreived From:https://cloud.google.com/storage-transfer/docs/create-client, Jul. 18, 2019, 7 Pages.
"Okta User Migration Guide", Retreived From: https://www.okta.com/resources/whitepaper/okta-user-migration-guide/, Jul. 18, 2019, 6 Pages.
Christensen, "Manage Multiple AWS Accounts with AWS Landing Zone—Published", Retreived From: https://www.logicworks.com/blog/2018/08/multiple-accounts-aws-landing-zone/, Aug. 1, 2018, 5 Pages.
PCT/CN2019/106112—International Preliminary Report and Written Opinion of the International Searching Authority, dated Jun. 16, 2020, 5 pages.
"Extended Search Report Issued in European Patent Application No. 19945700.3", dated May 15, 2023, 7 Pages.
Office Action Received for Chinese Application No. 201980091501.6, dated Jan. 12, 2024, 11 pages.

* cited by examiner

CENTRALIZED REMOTE MIGRATION CLIENT CREDENTIAL MANAGEMENT

CROSS-REFERENCE TO RELATED APPLICATION

This application is a national stage application, filed under 35 U.S.C. §, of International Patent Application No. PCT/CN2019/106112, filed on Sep. 17, 2019, which is incorporated by reference herein in its entirety.

BACKGROUND

The use of cloud-based computing services has greatly increased in recent years. When enterprises expand their networks to the cloud-based computing services, limitations may be encountered. Ensuring that users can securely access and control their on-premises data can be challenging given the total amount of assets that many users typically have in their networks. Large scale operations such as migration of multiple virtual machines to the cloud may require repetitive tasks to securely access and control the user's machines. Furthermore, security measures such as firewalls typically limit the accessibility of a user's assets from the cloud service provider. This can lead to a number of inefficiencies, as security features must be applied to the user's assets, and yet such security features may hinder the accessibility and control of the user's assets by the cloud service provider. The additional effort and cost may become a barrier for users to migrate their assets to the virtualized environment.

Such limitations can cause a number of inefficiencies and a less than desirable user experience.

SUMMARY

Embodiments of this disclosure are directed to the centralized storage and management of user credentials. It is often desirable to remotely access and control a user's network by a cloud-based service provider. For example, for large scale migration of a user's computing resources to the cloud involving multiple client machines, the service provider may need to be able to use the correct credentials required for the authorization for movement of content. The disclosed embodiments provide for a centralized location that stores the credentials, receives encrypted commands, and securely pushes down the credentials and commands to enable remote control of the users assets. This alleviates the need to individually be authorized to access each of the user's machines, while at the same time maintaining security of the user's assets and protecting the integrity of the credentials. Thus the multiple steps to manually access individual machines can be consolidated by allowing for one central location to securely maintain the credentials.

The techniques disclosed herein provide a number of improvements over existing systems. For instance, when the credentials are stored at a centralized service, such as Google Drive, iCloud, or OneDrive, the need to repeatedly access and provide credentials to multiple assets can be avoided, as well as the need to contend with multiple credentials and synchronize credential versions. The techniques disclosed herein further improve user interaction with a computer along with providing improvements with respect to processing resources, network resources, and memory resources.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Various embodiments are described for enabling the centralized storage and management of user credentials. Embodiments provide for a centralized location that stores the credentials, receives encrypted commands, and securely pushes down the credentials and commands to enables remote control of the user's assets.

Figure 1:
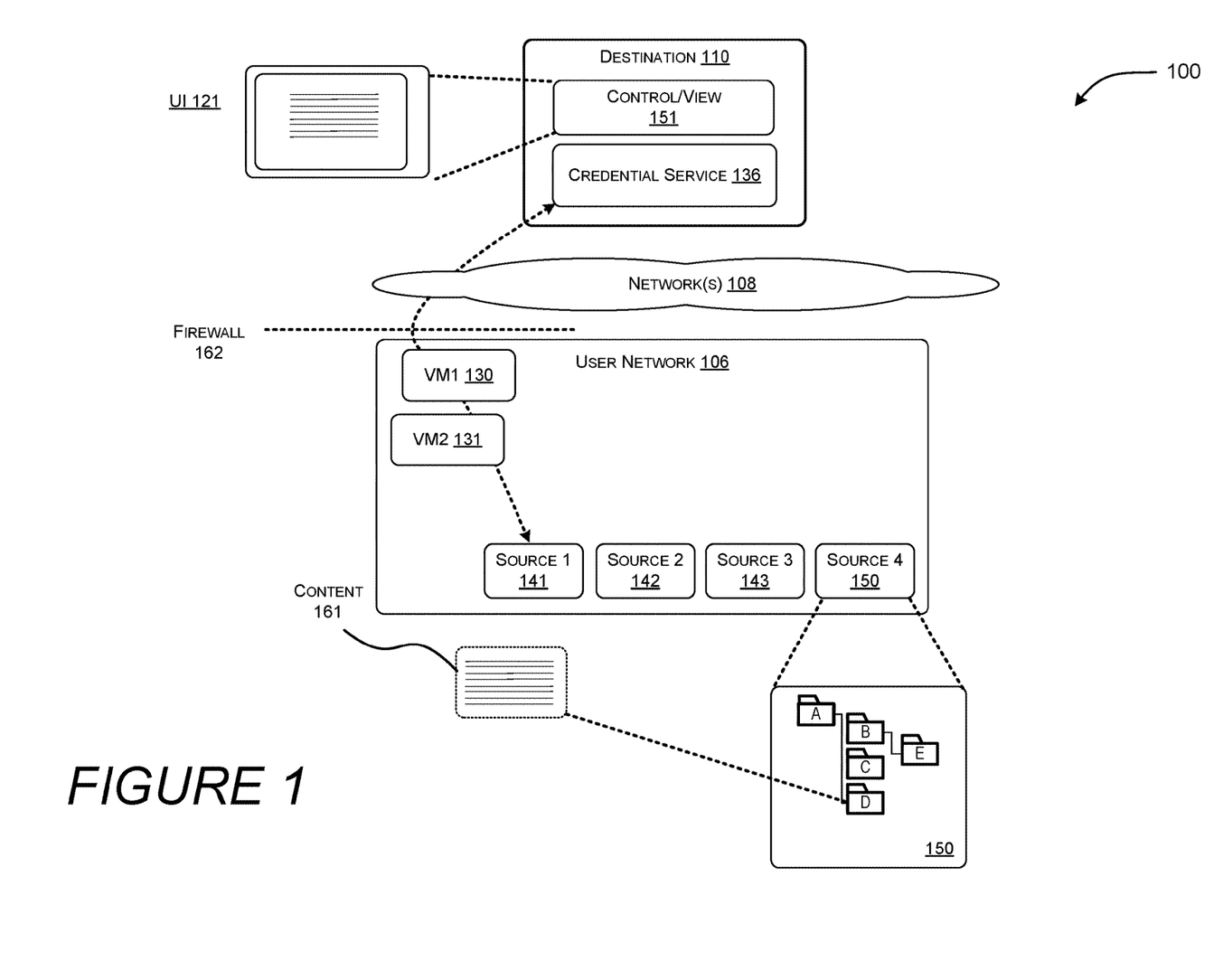
FIG. 1 is a block diagram of a system for accessing a user network.

Referring to FIG. 1, illustrated is an example of a user network 106 that includes a number of user sources 141, 142, 143, and 150. The user network may include one or more virtual machines 130, 131. The sources 141, 142, 143, and 150 may host various data and applications, including, for example, file system 150 that enables access to content 161. The sources 141, 142, 143, and 150 at the user network 106 may be protected via firewall 161. In some cases, the user may wish to remotely access their network and perform operations. For example, the use may wish to migrate some of the user's assets such as virtual machines 130, 131 to a cloud environment 110 via network 108. In user environments with multiple virtual machines and multiple sources, accessing the user's assets by the cloud environment 110 through the firewall may require extensive credential management and complexity. The system 100 can also include one or more networks 108 for enabling the computing devices to communicate. This example is provided for illustrative purposes and is not to be construed as limiting.

It can be appreciated that the system 100 can include any number of computers. The cloud service can be in the form of a personal computer, a server farm, a large-scale computer system or any other computing system having components for processing, coordinating, collecting, storing, and/or communicating data between one or more computing devices. Examples of such services include storage services provided by OneDrive, Dropbox, Microsoft, Amazon, Apple, Google, etc.

In an embodiment, a control/view function may be provided that enables an administrator, via U1 121, to remotely initiate actions on the user network 106. A credential service 136 may be provided for centralized control of the user assets. The credential service 136 may provide storage and management of credentials in one location, enabling control of the user assets behind firewall 162.

Figure 2:
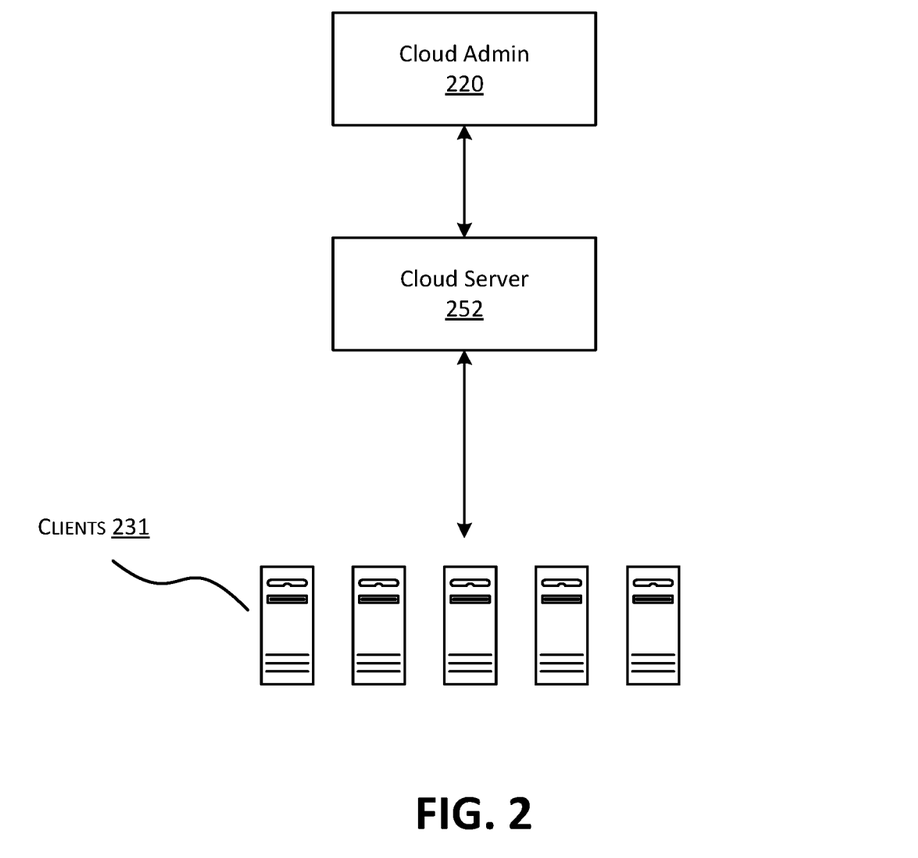
FIG. 2 is a block diagram showing a system for accessing a user network.

Referring to FIG. 2, illustrated is a cloud administrator 220 and cloud server 252. The cloud administrator 220 may send tasks and commands to the cloud server 252, and may receive results and reports from cloud server 252. The cloud server 252 may send the tasks and commands to the clients 231 for action and completion. The clients 231 may send results and reports to cloud server 252, which may provide status to the cloud administrator 220, for example via U1 121 of FIG. 1.

In one embodiment, an installer or an agent may be created and installed on each user virtual machine. The installer/agent may, for example, be added to each user virtual machine. In one embodiment, the installer/agent may be unique for each user, for example, with a unique ID or a unique handshake. After the installer/agent is added, a connection may be initiated on each machine. Registration may be unique for each user and destination. In an embodiment, registration may be implemented with credentials via HTTPS and not a virtual private network (VPN). Via the HTTPS connection, commands may be dispatched from the cloud-based platform into a machine inside the user environment in a secure fashion. In one implementation, credentials may be passed to each machine. In some embodiments, access may be focused or limited, for example to access a specific location. For example, each virtual machine may only access what it is authorized for. The disclosed embodiments thus enable a remote service to access on-premise resources via remote and centralized credential management.

The credentials may be of various types, for example username/password, or any form of credential such as multi-factor authentication (MFA), active directory, etc. The commands may include not only migration but any type of command that may be executed at the user network, such as obtaining file system information and deploying file system commands.

Figure 3:
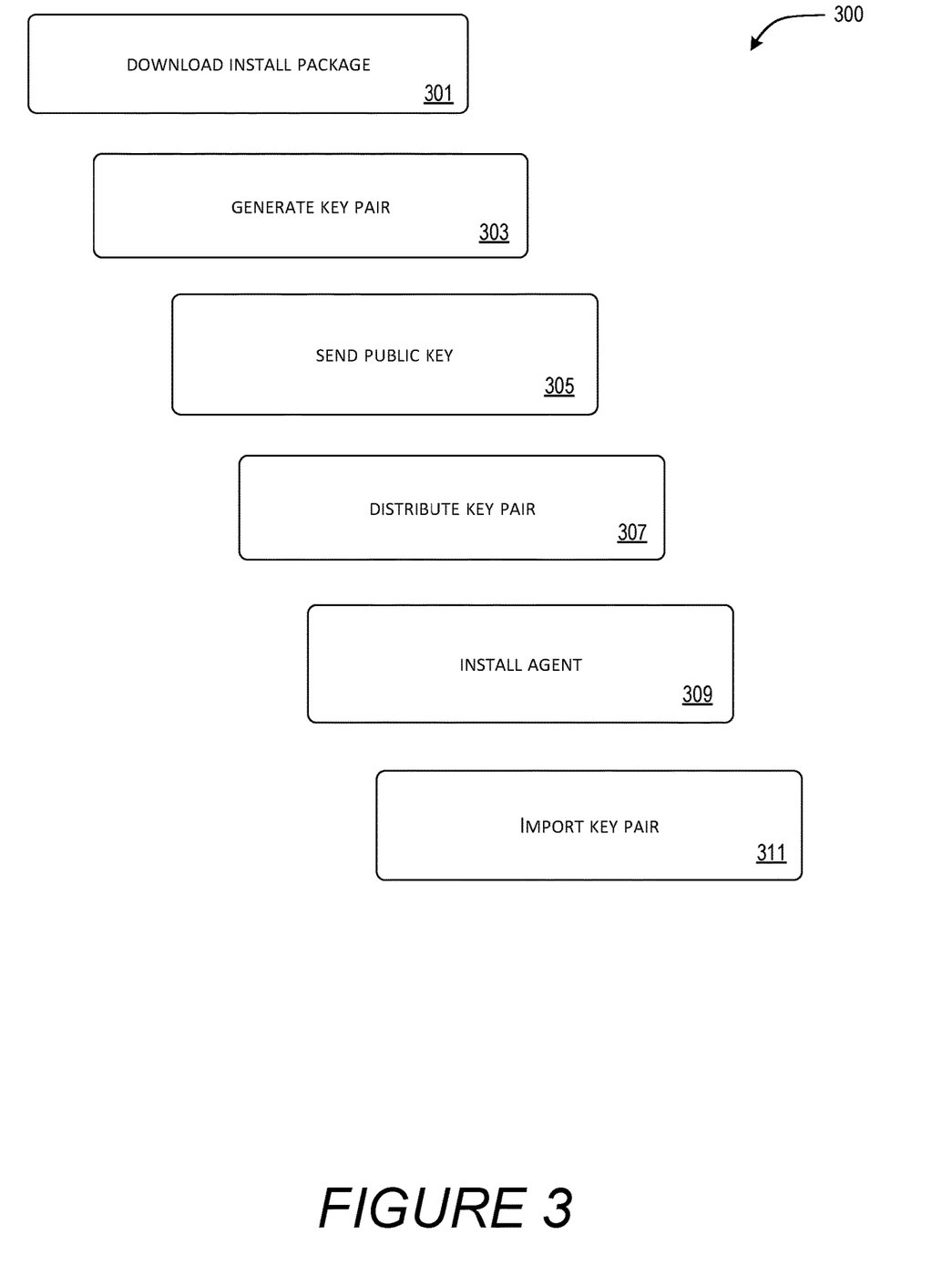
FIG. 3 is a flow diagram showing aspects of a routine for accessing a user network.

FIG. 3 illustrates an example procedure in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

In an embodiment, a key pair may be generated including a public key that may be used to encrypt the credentials. The user may retain and store the private key. The cloud provider may use the public key to encrypt credentials and/or commands. The public key may be saved in a secure store at the cloud provider.

In one embodiment, when a client is registered, the public key may be sent to the cloud service provider, and the key pair may be stored in a secure key store. When a task is created by an administrator, for example at a U1, the task and the encrypted password may be sent to the cloud provider. The cloud provider may send the task to the client (e.g., an entity that will execute the task at the user network) along with the encrypted password. The client may obtain the private key using the credentials.

By using this arrangement, the cloud provider does not need to store user information. The cloud provider encrypts commands and passwords and forwards the encrypted information to the clients for decryption and execution. In an embodiment, the same private key may be used by multiple clients (multiple machines). In one embodiment, a temporary password may be used to protect the private key. The encrypted private key may be forwarded to another machine.

The progress of task completion may be provided to the cloud provider who may render a status of the progress on the UI.

The cloud provider may implement a secure store to store the public key, the encrypted login password (encrypted using the public key), and the encrypted user passwords (encrypted using the public key). The client may use a local key store to store the public key and private key.

When any operation is requested for an asset on the user's network, the described authorization process may be triggered. Once authorized, the accessed machine can treat continue to receive and execute commands from the cloud service provider By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the client device 226. For purposes of the claims, the phrase "computer storage medium," "computer-readable storage medium," and variations thereof, does not include waves, signals, and/or other transitory and/or intangible communication media, per se.

Figure 4:
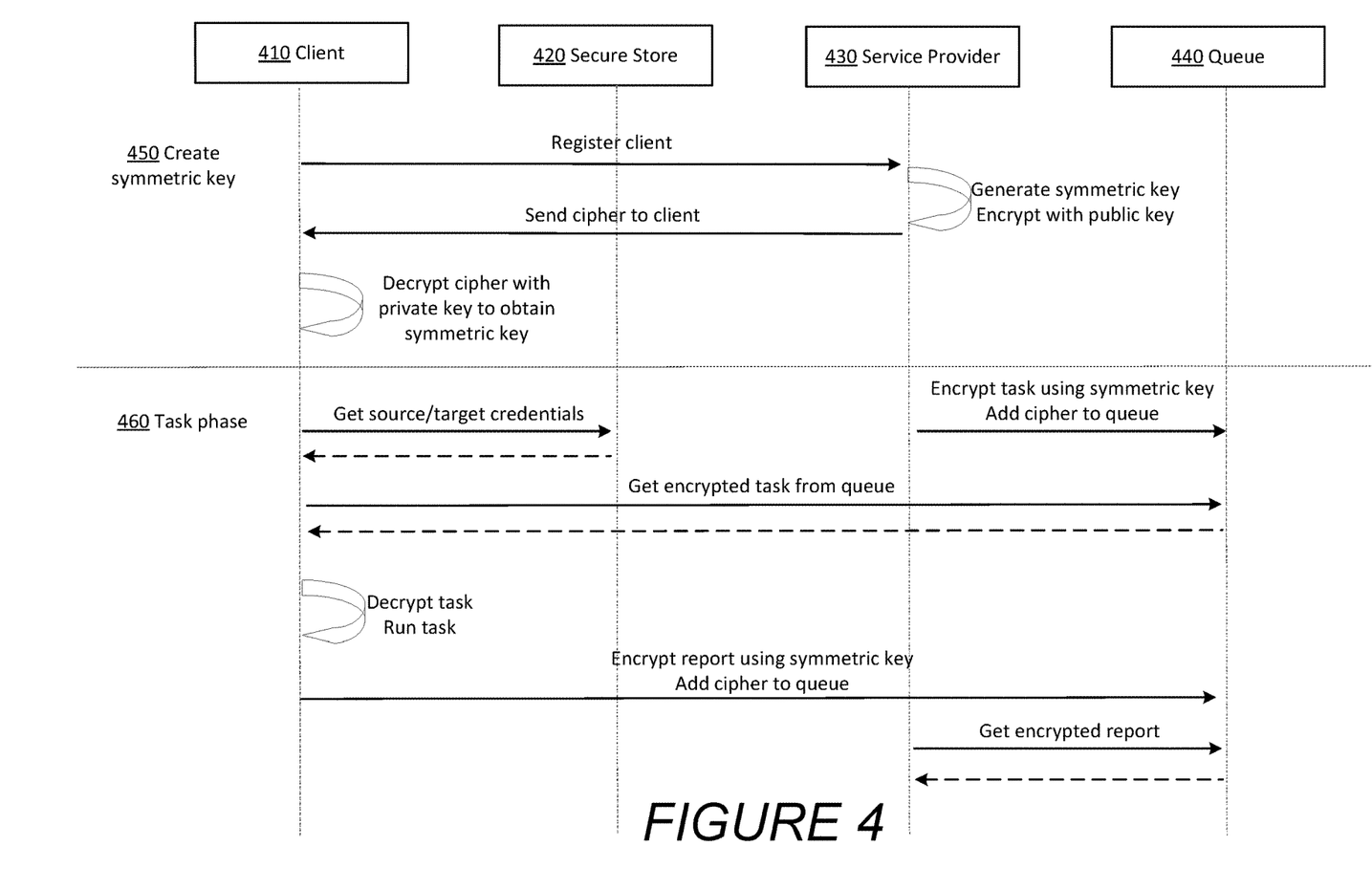
FIG. 4 is a flow diagram showing aspects of a routine for accessing a user network.

Turning now to FIG. 4, aspects of an example data flow 400 are illustrated, depicting an example implementation of the described techniques, for controlling access to data stored in a cloud-based storage service are shown and described below. In an embodiment, a client 410 may be registered by a cloud service provider 430. A symmetric key may be generated 450 and a public key may be used to encrypt the symmetric key. The cloud service provider 430 may send the encrypted symmetric key to the client 410, who may use a private key to decrypt the encrypted symmetric key.

The client 410 may obtain credentials from secure store 420. The service provider may encrypt a task using the symmetric key and add the encrypted task to queue 440. Client 410 may obtain the encrypted task from queue 440 and decrypt the encrypted task. The client 410 may execute the task.

The client 410 may encrypt a report of the completed task using the symmetric key and add the encrypted report to queue 440. The service provider 430 may obtain the encrypted report from queue 440.

Figure 5:
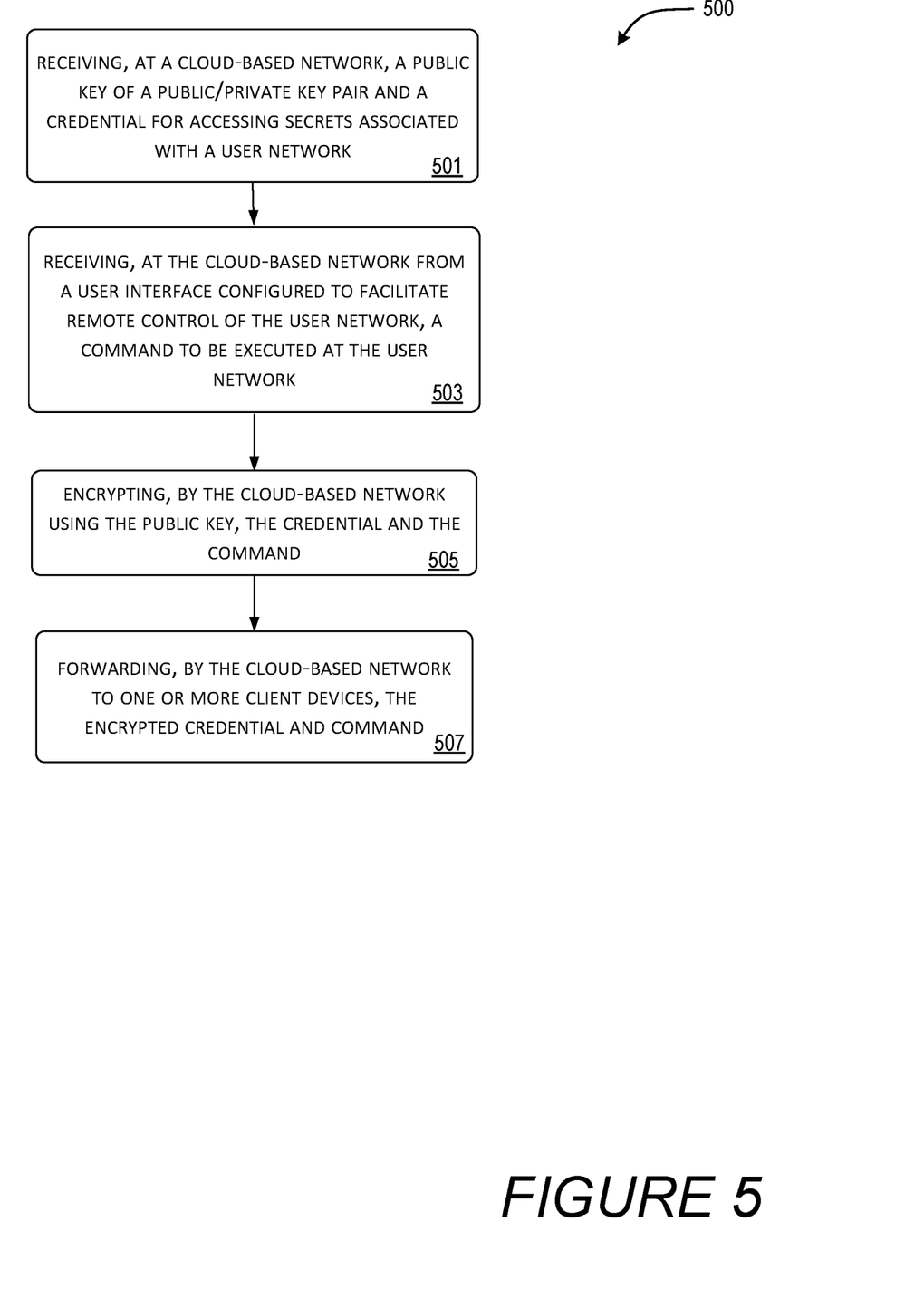
FIG. 5 is a flow diagram showing aspects of a routine for accessing a user network.

Turning now to FIG. 5, aspects of an example data flow 400 are illustrated, depicting an example implementation of the described techniques, for controlling access to data stored in a cloud-based storage service are shown and described below.

Turning now to FIG. 5, aspects of a routine 500 for controlling access to data stored in a cloud-based storage service are shown and described below. With reference to FIG. 5, the routine 500 begins at operation 501 which illustrates receiving, at a cloud-based network, a public key of a public/private key pair and a credential for accessing secrets associated with a user network.

Next, operation 503 illustrates receiving, at the cloud-based network from a user interface configured to facilitate remote control of the user network, a command to be executed at the user network.

Operation 505 illustrates encrypting, by the cloud-based network using the public key, the credential and the command.

Next, operation 507 illustrates forwarding, by the cloud-based network to one or more client devices, the encrypted credential and command. In an embodiment, the client devices are configured to decrypt the encrypted credential and command using a private key of the public/private key pair and execute the command on the user network.

In an embodiment, the client devices include an agent configured to store the private key and decrypt the encrypted credential and command using the private key.

In an embodiment, the cloud-based network receives, from the client devices, a status indicative of a progress of execution of the command.

In an embodiment, the command is a command to migrate one or more virtual machines from the user network to the cloud-based network.

In an embodiment, the credential is usable to access the user network by a plurality of client devices.

In an embodiment, the encrypted credential and command are sent via an HTTPS connection.

In an embodiment, the user network is protected by a firewall.

In an embodiment, the credential is one or more of a username, password, or MFA credential.

In an embodiment, the cloud-based network does not persistently store the credential in an unencrypted form.

In an embodiment, the user interface is configured to enable a remote user to send a command for execution at the user network.

Figure 6:
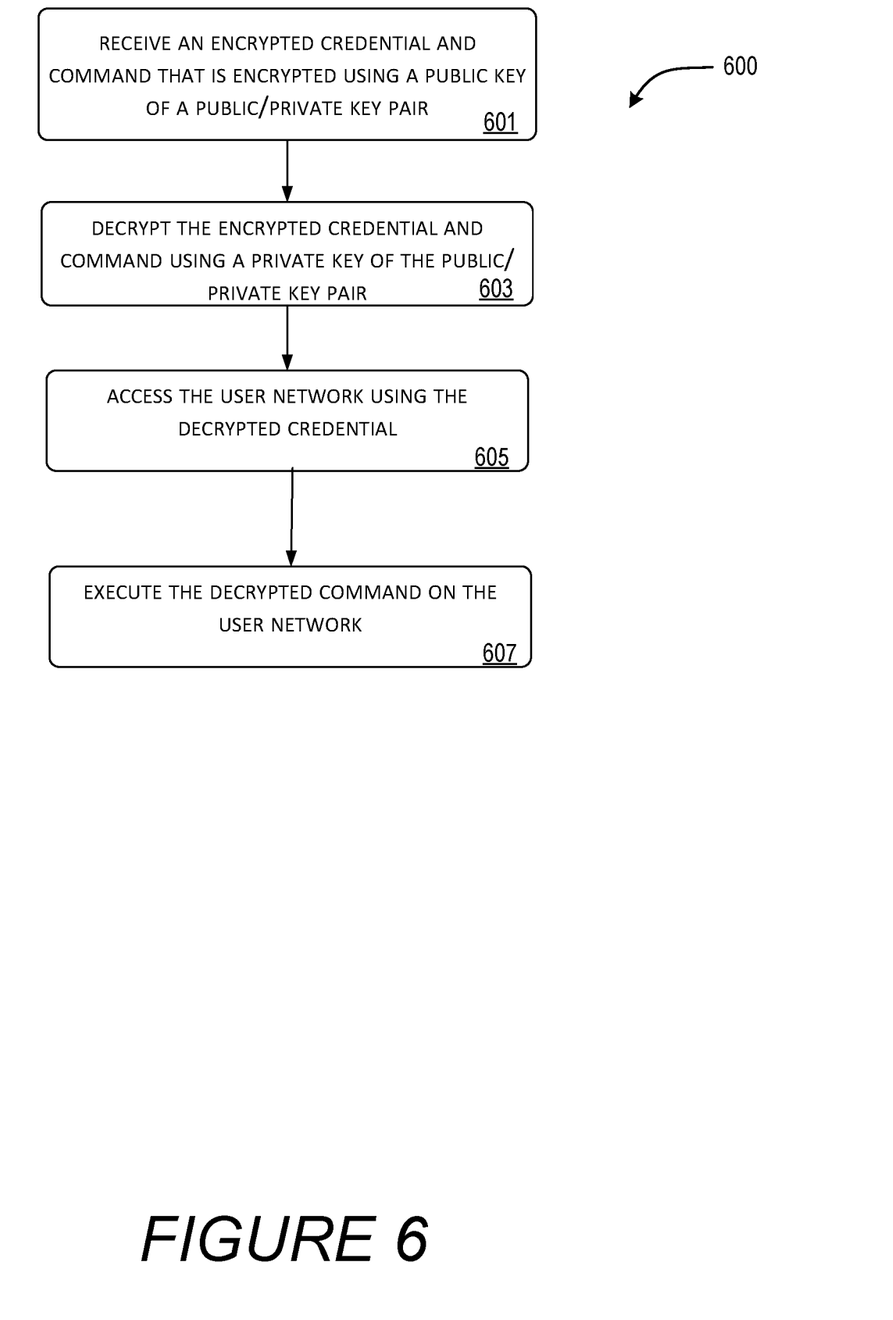
FIG. 6 is a flow diagram showing aspects of a routine for accessing a user network

Turning now to FIG. 6, aspects of a routine 600 for controlling access to a user network are shown and described below. With reference to FIG. 6, the routine 600 begins at operation 601 where a cloud-based network receives an encrypted credential and command that is encrypted using a public key of a public/private key pair. In an embodiment, the credential is for accessing secrets associated with a user network and the command is to be executed at the user network.

Next, at operation 603, the encrypted credential and command are decrypted using a private key of the public/private key pair.

Operation 605 illustrates accessing the user network using the decrypted credential.

Operation 607 illustrates executing the decrypted command on the user network.

Figure 7:
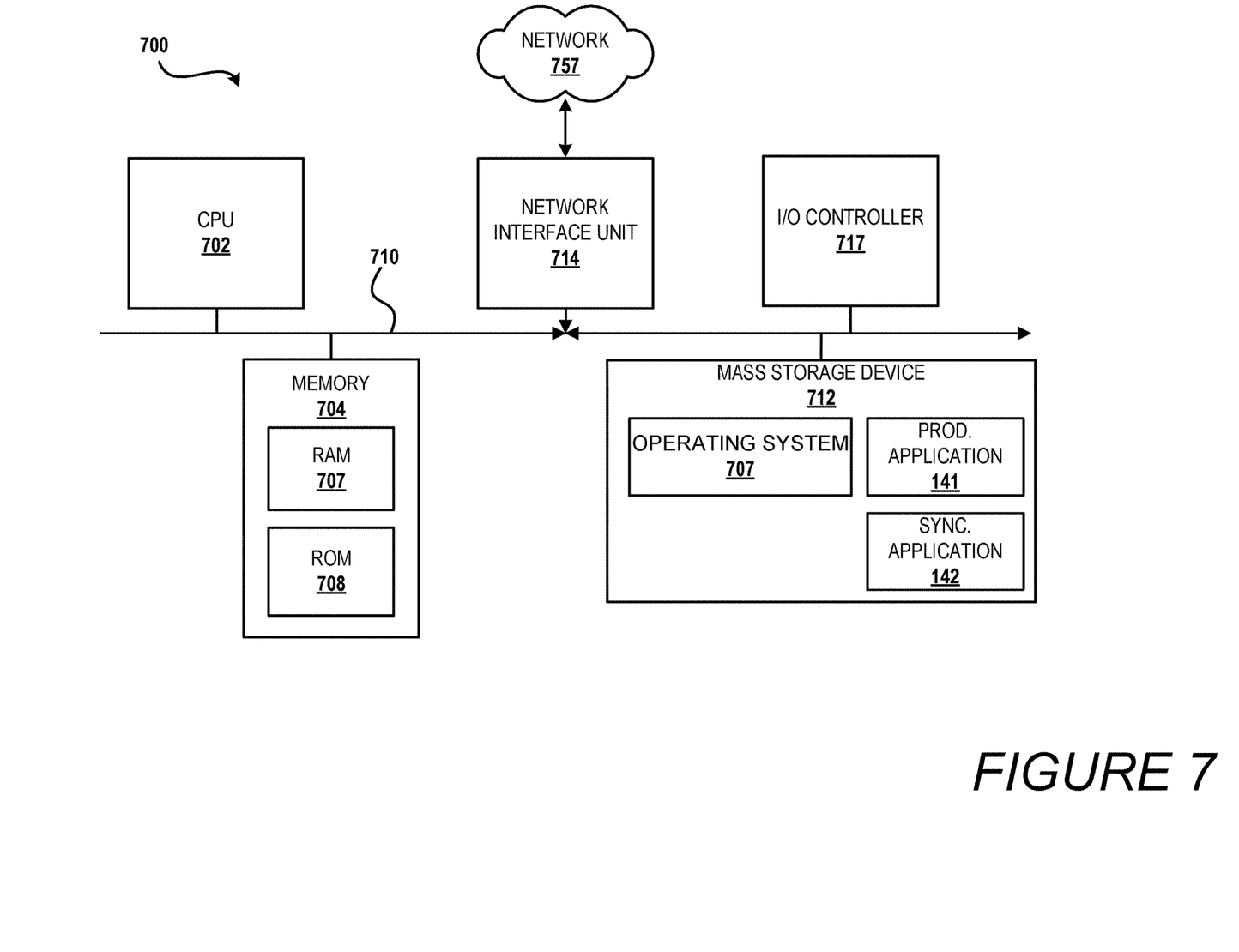
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the computing device 107 (FIG. 1), capable of executing the program components described herein. Thus, the computer architecture 700 illustrated in FIG. 7 illustrates an architecture for a server computer, a mobile phone, a PDA, a smart phone, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 707 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 707, other data, and one or more application programs, such as a productivity application 141 and a synchronization application 142.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"). HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 757 and/or another network (not shown). The computer architecture 700 may connect to the network 757 through a network interface unit 714 connected to the bus 710. It should be appreciated that the network interface unit 714 also may be utilized to connect to other types of networks and remote computer systems. The computer architecture 700 also may include an input/output controller 717 for receiving and processing input from a number of other devices, including a keyboard, mouse, or electronic stylus (not shown in FIG. 7). Similarly, the input/output controller 717 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media arc possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Figure 8:
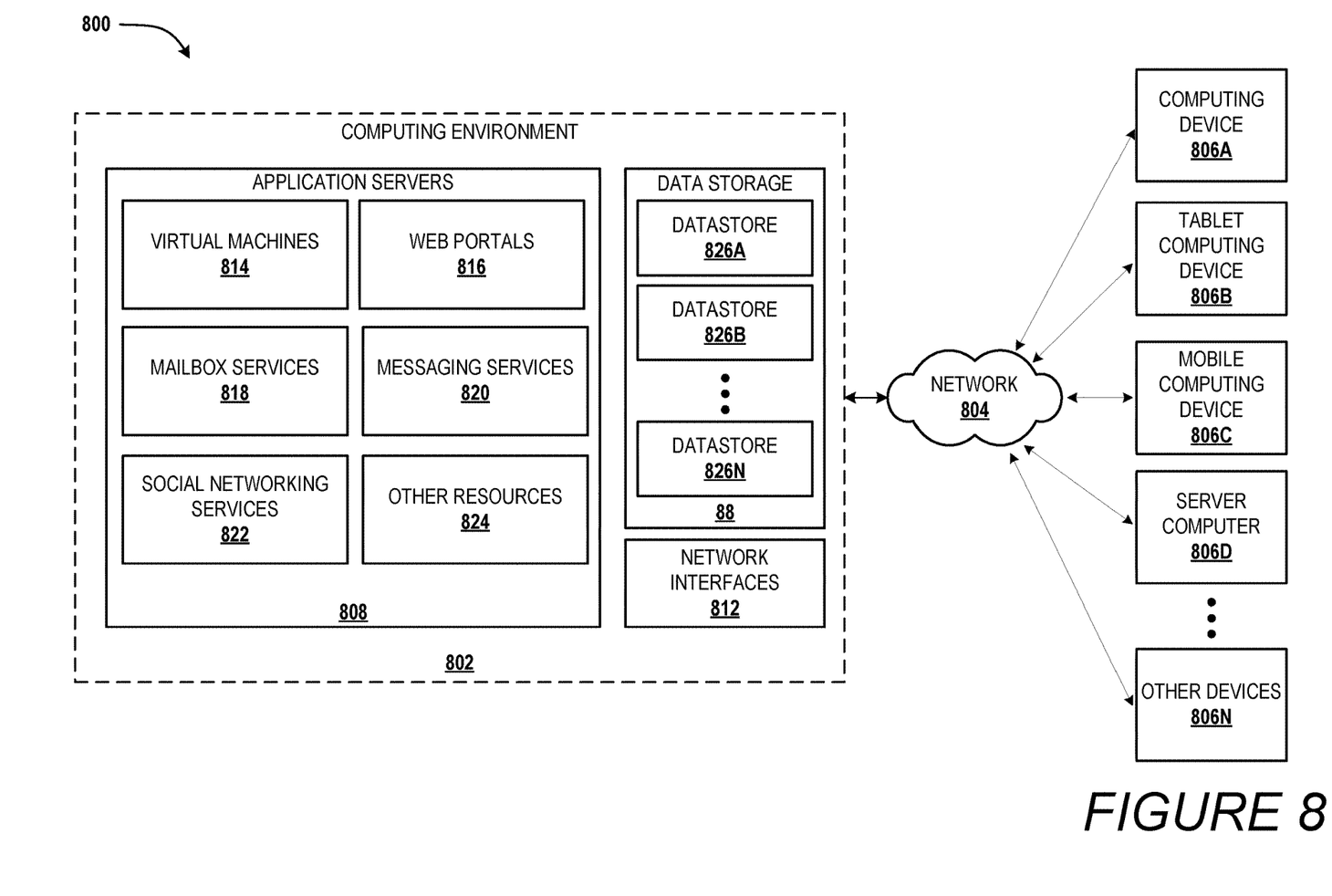
FIG. 8 is a diagram illustrating a distributed computing environment capable of implementing aspects of the techniques and technologies presented herein.

FIG. 8 depicts an illustrative distributed computing environment 80) capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

According to various implementations, the distributed computing environment 800 includes a computing environment 802 operating on, in communication with, or as part of the network 804. The network 804 may be or may include the network 959, described above with reference to FIG. 9. The network 804 also can include various access networks. One or more client devices 806A-806N (hereinafter referred to collectively and/or generically as "clients 806" and also referred to herein as computing devices 86) can communicate with the computing environment 802 via the network 804 and/or other connections (not illustrated in FIG. 8). In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. Two example computing architectures for the clients 806 are illustrated and described herein with reference to FIGS. 9 and 8. It should be understood that the illustrated clients 806 and computing architectures illustrated and described herein are illustrative, and should not be construed as being limiting in any way.

In the illustrated configuration, the computing environment 802 includes application servers 808, data storage 88, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for enabling in-application support for topological changes to files during remote synchronization. It should be understood that this configuration is illustrative, and should not be construed as being limiting in any way. The application servers 808 also host or provide access to one or more portals, link pages, Web sites, and/or other information ("Web portals") 816.

According to various implementations, the application servers 808 also include one or more mailbox services 818 and one or more messaging services 820. The mailbox services 818 can include electronic mail ("email") services. The mailbox services 818 also can include various personal information management ("PIM") and presence services including, but not limited to, calendar services, contact management services, collaboration services, and/or other services. The messaging services 820 can include, but are not limited to, instant messaging services, chat services, forum services, and/or other communication services.

The application servers 808 also may include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 822 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the above configurations are illustrative, and should not be construed as being limited in any way. According to various implementations, the social networking services 822 may host one or more applications and/or software modules for providing the functionality described herein, such as enabling in-application support for topological changes to files during remote synchronization. For instance, any one of the application servers 808 may communicate or facilitate the functionality and features described herein. For instance, a social networking application, mail client, messaging client or a browser running on a phone or any other client 806 may communicate with a networking service 822 and facilitate the functionality, even in part, described above with respect to FIG. 8. Any device or service depicted herein can be used as a resource for supplemental data, including email servers, storage servers, etc.

As shown in FIG. 8, the application servers 808 also can host other services, applications, portals, and/or other resources ("other resources") 824. The other resources 824 can include, but are not limited to, document sharing, rendering or any other functionality. It thus can be appreciated that the computing environment 802 can provide integration of the concepts and technologies disclosed herein with various mailbox, messaging, social networking, and/or other services or resources.

As mentioned above, the computing environment 802 can include the data storage 88. According to various implementations, the functionality of the data storage 88 is provided by one or more databases operating on, or in communication with, the network 804. The functionality of the data storage 88 also can be provided by one or more server computers configured to host data for the computing environment 802. The data storage 88 can include, host, or provide one or more real or virtual datastores 826A-826N (hereinafter referred to collectively and/or generically as "datastores 826"). The datastores 826 are configured to host data used or created by the application servers 808 and/or other data. Although not illustrated in FIG. 8, the datastores 826 also can host or store web page documents, word documents, presentation documents, data structures, algorithms for execution by a recommendation engine, and/or other data utilized by any application program or another module. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects. In one specific example, as summarized above, techniques described herein may be implemented, at least in part, by a web browser application, which works in conjunction with the application servers 808 of FIG. 8.

What is claimed is:

1. A method for remotely accessing client computing resources, the method comprising:
   securely storing, at a secure key store of a cloud-based network, a public key of a public/private key pair, and a credential associated with a user network;
   encrypting a symmetric key using the public key to generate an encrypted symmetric key;
   receiving, at the cloud-based network from a user interface configured to facilitate remote control of the user network, a command to be executed at the user network to cause a change at the user network, wherein the user network is remote from the cloud-based network and the user interface;
   encrypting, by the cloud-based network using the public key, the credential and the command or task to generate an encrypted credential and an encrypted command or task;
   adding the encrypted command or task to a queue;
   forwarding, by the cloud-based network to agents installed on a plurality of client devices at the user network, the encrypted credential and the encrypted symmetric key, wherein the agents are unique for a user associated with the plurality of client devices based on a unique ID or handshake and wherein the agents installed on the plurality of client devices are configured to:
      decrypt the encrypted credential and the encrypted symmetric key using a private key of the public/private key pair;
   wherein the plurality of client devices are configured to:
      access, the user network using the credential;
      obtain the encrypted command or taks from the queue;
      decrypt the encrypted command or taks using the private key of the public/private key pair;
      execute the command or tak on the user network to cause the change at the user network, wherein the command or task is a command or task to migrate one or more virtual machines from the user network to the cloud-based network;
      encrypt a report of the executed command or task using the symmetric key to generate an encrypted report; and
      add the encrypted report to the queue, wherein the cloud-based network obtains the encrypted report from the queue to view a status indicative of a progress of execution of the command or task.

2. The method of claim 1, wherein the encrypted credential and command are sent via an HTTPS connection.

3. The method of claim 1, wherein the user network is protected by a firewall.

4. The method of claim 1, wherein the credential is one or more of a username, password, or MFA credential.

5. The method of claim 1, wherein the cloud-based network does not persistently store the credential.

6. The method of claim 1, wherein the user interface is configured to enable a remote user to send a command for execution at the user network.

7. A system for accessing a user network, the system comprising:
   one or more data processing units; and
   a computer-readable memory having encoded thereon computer-executable instructions to cause the one or more data processing units to perform operations comprising:
   receive, from a cloud-based network by agents installed on the system, an encrypted credential and an encrypted symmetric key encrypted using a public key of a public/private key pair, wherein the encrypted credential is associated with a user network, wherein the agents are unique for a user associated with the system based on a unique ID or handshake and wherein the user network is remote from the cloud-based network;
   obtain an encrypted command or task from a queue, wherein the command or task is to be executed at the user network to cause a change at the user network, and wherein the command or task is encrypted using public key of the public/private key pair;
   decrypt, by the agents installed on the system, the encrypted credential using a private key of the public/key pair to determine a decrypted credential and decrypt the command or task using the private key to determine a decrypted command or task;
   access the user network using the decrypted credential;
   execute, the decrypted command or task on the user network, wherein the command or task is a command or task to migrate one or more virtual machines from the system to the cloud-based network;
   encrypt a report of the executed command or task using the symmetric key to generate an encrypted report; and
   add the encrypted report to the queue to allow the cloud-based network to obtain the encrypted report from the queue to view a status indicative of a progress of execution of the command or task.

8. The system of claim 7, wherein the credential and command is entered from a user interface configured to facilitate remote control of the user network.

9. The system of claim 7, wherein the encrypted credential and command are received via an HTTPS connection.

10. The system of claim 7, wherein the credential is one or more of a username, password, or MFA credential.

11. The system of claim 7, wherein the private key is stored in a key store on the system.

12. A computing device comprising:
one or more data processing units; and
a computer-readable memory having encoded thereon computer-executable instructions to cause the one or more data processing units to perform operations comprising:
receiving, a public key of a public/private key pair, and a credential associated with a user network, and a symmetric key;
receiving, from a a user interface configured to facilitate remote control of the user network, a command or task to be executed at the user network to cause a change at the user network, wherein the user network is remote from the computing device and the user interface;
encrypting, using the public key, the credential, the symmetric key, and the command or task to generate an encrypted, an encrypted symmetric key, and an encrypted command or task;
adding the encrypted command or task to a queue;
forwarding, to agents installed on a plurality of client devices at the user network, the encrypted credential and the encrypted symmetric key, wherein the agents are unique for a user associated with the plurality of client devices based on a unique ID or handshake and, wherein the agents installed on the plurlaity of client devices are configured to:
    decrypt the encrypted credential and the encrypted symmetric key using a private key of the public/private key pair;
wherein the plurality of client devices are configured to:
    access the user network using the credential;
    obtain the encrypted command or task from the queue;
    decrypt the encrypted command or task using the private key of the public/private key pair;
    execute the command or task on the user network to cause the change at the user network, wherein the command or task is a command or task to migrate one or more virtual machine from the user network to a cloud-based network;
    encrypt a report of the executed command or task using symmetric key to generate an encrypted report;
    add the encrypted report to the queue; and
obtaining the encrypted report from the queue to view a status indicative of a progress of execution of the command or task.

\* \* \* \* \*